US011011760B2

(12) United States Patent
Yano

(10) Patent No.: US 11,011,760 B2
(45) Date of Patent: May 18, 2021

(54) FUEL CELL SEPARATOR CONVEYING DEVICE

(71) Applicant: TOYOTA JIDOSHA KABUSHIKI KAISHA, Toyota (JP)

(72) Inventor: Shimpei Yano, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 16/260,904

(22) Filed: Jan. 29, 2019

(65) Prior Publication Data

US 2019/0260040 A1 Aug. 22, 2019

(30) Foreign Application Priority Data

Feb. 22, 2018 (JP) .............................. JP2018-030190

(51) Int. Cl.
| | |
|---|---|
| *H01M 8/0276* | (2016.01) |
| *B65G 49/06* | (2006.01) |
| *H01M 8/2404* | (2016.01) |
| *H01M 8/0247* | (2016.01) |

(52) U.S. Cl.
CPC ........ *H01M 8/0276* (2013.01); *B65G 49/061* (2013.01); *B65G 49/068* (2013.01); *H01M 8/0247* (2013.01); *H01M 8/2404* (2016.02); *B65G 2249/045* (2013.01)

(58) Field of Classification Search
CPC ...... H01M 8/00; H01M 8/0202; B65G 59/05; B65G 49/061; B65G 47/91
USPC ......................................................... 429/452
See application file for complete search history.

(56) References Cited

U.S. PATENT DOCUMENTS

2002/0172586 A1* 11/2002 Donner ................ B65G 59/023
414/796.9
2012/0214087 A1* 8/2012 Akiyama ............ H01M 8/0271
429/509

FOREIGN PATENT DOCUMENTS

| DE | 1995989 U | 10/1968 |
|---|---|---|
| DE | 19653953 A1 | 6/1998 |
| EP | 0532949 A1 | 3/1993 |
| JP | 2007-280879 A | 10/2007 |
| JP | 2010212002 A * | 9/2010 |
| JP | 2015-012246 A | 1/2015 |
| JP | 2016-42481 A | 3/2016 |
| KR | 20090059819 A * | 6/2009 |
| KR | 20090060869 A * | 6/2009 |
| KR | 1020090059819 A | 6/2009 |
| KR | 1020090060869 A | 6/2009 |

(Continued)

*Primary Examiner* — Jayne L Mershon
(74) *Attorney, Agent, or Firm* — Oliff PLC

(57) ABSTRACT

A fuel cell separator conveying device that ensures reducing dirt adhesion on a sealing surface of a stacked fuel cell separator using a protection sheet and reducing the protection sheet being left adhered when the fuel cell separator is conveyed is provided. The fuel cell separator conveying device that lifts up and conveys the fuel cell separator placed on the protection sheet includes a grasping portion that grasps the fuel cell separator by a suction force, a moving unit that moves the grasping portion in a lift-up direction of the fuel cell separator, and an air blowing portion that applies a downward force in an opposite direction of the lift-up direction of the fuel cell separator to the protection sheet through an opening of the fuel cell separator when the moving unit moves the grasping portion.

3 Claims, 8 Drawing Sheets

(56) References Cited

FOREIGN PATENT DOCUMENTS

KR  20170103567 A  *  9/2017  ............ H01M 8/023

* cited by examiner

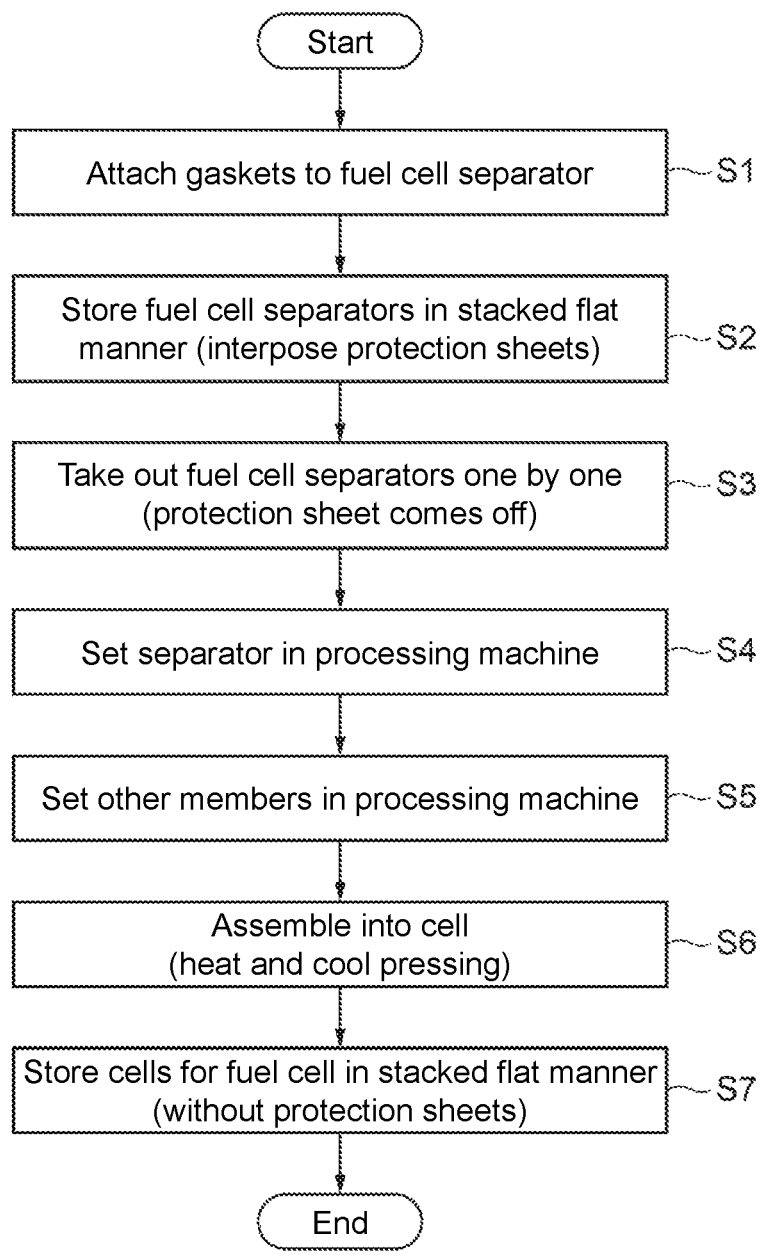

| Ascending Speed (mm/sec) | Lift-Up Amount (cm) | | |
|---|---|---|---|
| | First Embodiment | Second Embodiment | Conventional Example |
| 50 | No Lift-Up | No Lift-Up | 3 to 8 cm |
| 100 | 1 to 5 cm | No Lift-Up | 5 to 10 cm |
| 200 | 3 to 10 cm | No Lift-Up | 5 to 10 cm |

FUEL CELL SEPARATOR CONVEYING DEVICE

CROSS REFERENCE TO RELATED APPLICATIONS

The present application claims priority from Japanese patent application JP 2018-030190 filed on Feb. 22, 2018, the content of which is hereby incorporated by reference into this application.

BACKGROUND

Technical Field

The present disclosure relates to a fuel cell separator conveying device that lifts up and conveys a fuel cell separator.

Background Art

This type of fuel cell separator includes an anode side separator and a cathode side separator constituting a single cell for fuel cell, and there is disclosed a fuel cell separator in which gaskets are attached to exposed surface sides of these anode side separator and cathode side separator (see JP 2016-42481 A). There is also disclosed a fuel cell separator that reduces a state where neighboring separators suction one another by negative pressure, static electricity, or the like by forming an air layer between the neighboring separators (see JP 2007-280879 A).

SUMMARY

It is desirable that the anode side separators or the cathode side separators of the fuel cell separators described in JP 2016-42481 A are stored in a stacked manner in a state where the gaskets are attached in order to efficiently use a space in a work area until the anode side separators or the cathode side separators of the fuel cell separators are used in a subsequent process. However, directly stacking the fuel cell separators possibly causes dirt adhesion on sealing surfaces of the stacked fuel cell separators due to the gaskets. Therefore, it is necessary to stack the fuel cell separators with protection sheets interposed between the fuel cell separators.

Specifically, as illustrated in FIG. 8A, first, a protection sheet 2 is housed into a storage container 1 in the direction indicated by the arrow a, and subsequently, a fuel cell separator 4 to which gaskets 3 are attached is housed in the direction indicated by the arrow b to be stacked on the protection sheet 2. As illustrated in FIG. 8B, the protection sheets 2 and the fuel cell separators 4 are sequentially stacked alternately and stored. This reduces the dirt adhesion on the sealing surfaces of the fuel cell separators 4, and thus, the space in the work area is efficiently used.

However, in the case where the protection sheet 2 is interposed between the fuel cell separators 4, it is possible that the protection sheet 2 under the fuel cell separator 4 is lifted up together with the fuel cell separator 4 due to tackiness of the gasket 3 causing the protection sheet 2 to adhere to the gasket 3 when the stacked fuel cell separator 4 is lifted up by a moving device such as a conveying device 5 to be taken out of the storage container 1 as illustrated in FIG. 8C in order to use the fuel cell separator 4 in the subsequent process.

Additionally, in the case where the fuel cell separator 4 is lifted up at a relatively high speed, there occurs a problem that a negative pressure is generated between the lower surface on the opposite side of the lifting up direction of the fuel cell separator 4 and the protection sheet 2, that is, between the fuel cell separator 4 and the protection sheet 2 thereunder, and the protection sheet 2 is lifted up together with the fuel cell separator 4. Furthermore, if the protection sheet 2 is lifted up together with the fuel cell separator 4, there also occurs a problem that the protection sheet 2 may fall in its course of conveyance. As with the one described in JP 2007-280879 A, even when the air layer is simply provided between the separator and the protection sheet, a slight negative pressure is generated when the separator is grasped, and there occurs a problem that the protection sheet is lifted up just by this slight negative pressure.

The present disclosure has been made to solve such problems, and provides a fuel cell separator conveying device that ensures the reduced dirt adhesion on sealing surfaces of stacked fuel cell separators using protection sheets and the reduced protection sheet being left adhered when the fuel cell separator is conveyed.

(1) A fuel cell separator conveying device according to the present disclosure is a fuel cell separator conveying device that lifts up and conveys a fuel cell separator placed on a protection sheet. The fuel cell separator conveying device includes a grasping portion, a moving unit, and a pressing portion. The grasping portion grasps the fuel cell separator by suction force. The moving unit moves the grasping portion in a lift-up direction of the fuel cell separator. The pressing portion applies a downward force in an opposite direction of the lift-up direction of the fuel cell separator to the protection sheet through an opening of the fuel cell separator when the moving unit moves the grasping portion.

(2) The fuel cell separator conveying device according to the present disclosure is the fuel cell separator conveying device according to (1) described above where the pressing portion includes an air blowing portion that applies the downward force to the protection sheet by blowing air onto the protection sheet through the opening of the fuel cell separator.

(3) The fuel cell separator conveying device according to the present disclosure is the fuel cell separator conveying device according to (1) described above where the pressing portion includes a weight pressing portion that applies the downward force to the protection sheet by a self-weight by being placed on the protection sheet through the opening of the fuel cell separator.

The fuel cell separator conveying device according to the present disclosure described in (1) described above includes the grasping portion, which grasps the fuel cell separator by the suction force, the moving unit, which moves the grasping portion in the lift-up direction of the fuel cell separator, and the pressing portion, which applies the downward force in the opposite direction of the lift-up direction of the fuel cell separator to the protection sheet through the opening of the fuel cell separator when the moving unit moves the grasping portion. This configuration ensures causing the protection sheet to come off when the fuel cell separator is lifted up, so as to convey the fuel cell separator alone.

In the fuel cell separator conveying device according to the present disclosure described in (2) described above, the pressing portion includes the air blowing portion that applies the downward force to the protection sheet by blowing the air onto the protection sheet through the opening of the fuel cell separator. This configuration ensures causing the protection sheet to come off when the fuel cell separator is lifted up, so as to convey the fuel cell separator alone.

In the fuel cell separator conveying device according to the present disclosure described in (3) described above, the pressing portion includes the weight pressing portion that applies the downward force to the protection sheet by the self-weight by being placed on the protection sheet through the opening of the fuel cell separator. This configuration ensures causing the protection sheet to come off when the fuel cell separator is lifted up, so as to convey the fuel cell separator alone.

The present disclosure ensures providing a fuel cell separator conveying device that ensures the reduced dirt adhesion on the sealing surfaces of the stacked fuel cell separators using the protection sheets and the reduced protection sheet being left adhered when the fuel cell separator is conveyed.

BRIEF DESCRIPTION OF THE DRAWINGS

FIG. 2A illustrates a state before the fuel cell separator conveying device grasps a fuel cell separator, FIG. 2B illustrates a state where the fuel cell separator conveying device grasps the fuel cell separator and air is blown onto a protection sheet from air blowing portions, and FIG. 2C illustrates a state where the protection sheet that has come off is taken out;

FIG. 3 is a process drawing illustrating a manufacturing process of a cell for fuel cell constituted by the fuel cell separator conveying device in the first embodiment of the present disclosure;

FIG. 4A illustrates an explanatory view describing an ascending speed of the fuel cell separator conveying device and a lift-up amount, and FIG. 4B illustrates the relation between the ascending speeds of the fuel cell separator conveying device and the lift-up amounts of the protection sheet;

FIG. 6A illustrates a state before the fuel cell separator conveying device grasps the fuel cell separator, and FIG. 6B illustrates a state where the fuel cell separator conveying device grasps the fuel cell separator and pressing portions apply downward forces onto a protection sheet;

FIG. 7A illustrates a state where the protection sheet has come off, and FIG. 7B illustrates a state where the protection sheet that has come off is taken out; FIG. 8A illustrates a state where a storage container houses a protection sheet and a fuel cell separator, FIG. 8B illustrates a state where the storage container houses the protection sheets and the fuel cell separators in a stacked manner, and FIG. 8C illustrates a state where the fuel cell separator conveying device takes the fuel cell separator out of the storage container and conveys the fuel cell separator.

DETAILED DESCRIPTION

A description will be given of a fuel cell separator conveying device 10 according to a first embodiment and a fuel cell separator conveying device 20 according to a second embodiment to which a fuel cell separator conveying device according to the present disclosure is applied with reference to the drawings.

First Embodiment

Figure 1:
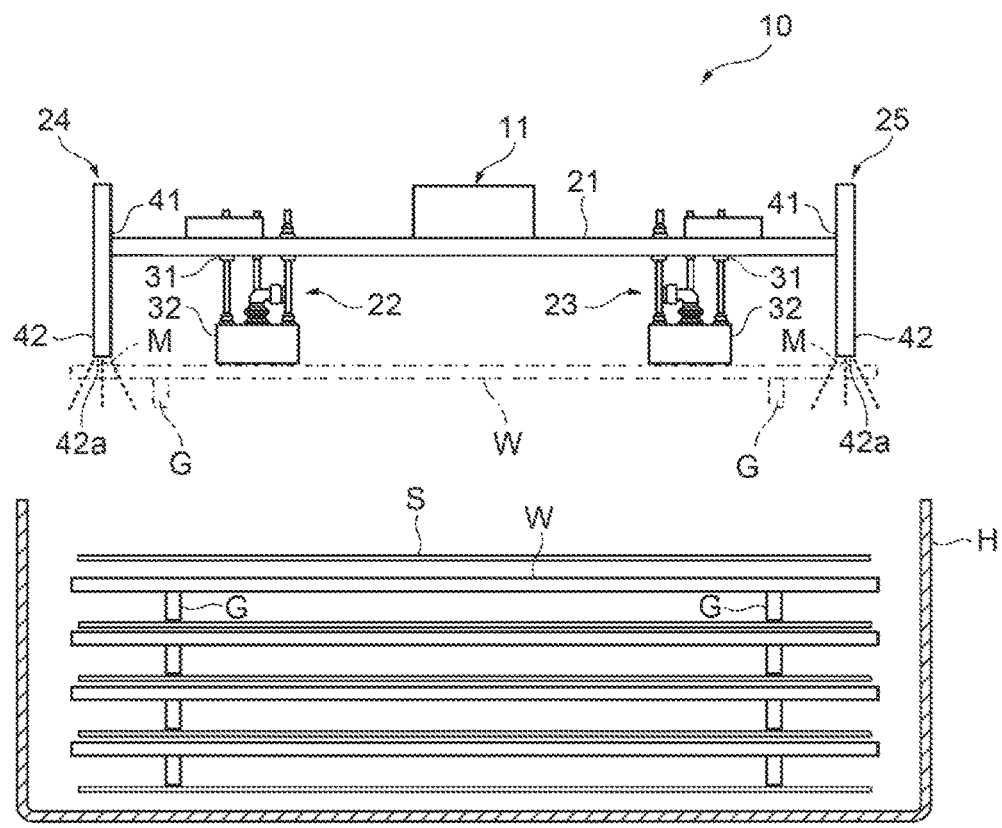
FIG. 1 includes a side view of a fuel cell separator conveying device and a cross-sectional view of a storage container according to a first embodiment of the present disclosure.

The fuel cell separator conveying device 10 includes a main body 11 illustrated in FIG. 1, a compressed air supply unit, a moving unit, a protection sheet taking-out unit, and a control unit, which are not illustrated. The fuel cell separator conveying device 10 is to lift up and convey a fuel cell separator W placed on a protection sheet S. The fuel cell separator conveying device 10 has a configuration in which, for example, a plurality of the fuel cell separators W stacked inside a storage container H with the protection sheets S interposed in-between are lifted up one by one while the protection sheet S is caused to come off, so as to take the fuel cell separator W out of the storage container H and convey the fuel cell separator W.

The fuel cell separator W includes a metal plate such as a steel plate, a stainless steel plate, and an aluminum plate, and produced by press forming. The fuel cell separator W is configured such that a surface treatment of, for example, a titanium (Ti) thin film and a carbon layer (C) is applied on the surface.

The fuel cell separator W includes an anode side fuel cell separator and a cathode side fuel cell separator. The anode side fuel cell separator is joined on an anode side gas diffusion layer that constitutes a membrane electrode gas diffusion layer assembly of a cell for fuel cell, and includes a fuel gas flow passage through which hydrogen as a fuel gas passes. The cathode side fuel cell separator is joined on a cathode side gas diffusion layer, and includes an oxidant gas flow passage through which air as an oxidant gas passes. The fuel cell separator W has manifold portions M as openings that form the fuel gas flow passage and the oxidant gas flow passage when stacked. The manifold portions M have a predetermined opening area, and are formed at respective positions apart on one side and the other side in the longitudinal direction of the fuel cell separator in this embodiment.

The fuel cell separator W has at least one surface on which gaskets G are attached. The gasket G is formed of an elastic material such as rubber and thermoplastic elastomer, and has a function to closely contact between the neighboring two fuel cell separators W to reduce the leak out of a reaction gas and a cooling medium to the outside when the cell for fuel cell are stacked to form a stacked body of the cells for fuel cell. The gasket G has tackiness (viscosity), and therefore, the protection sheet easily adheres. In this embodiment, the fuel cell separator W is stacked such that the gasket G is positioned on the lower surface inside the storage container H.

The main body 11 includes a base portion 21, grasping portions 22 and 23, and air blowing portions 24 and 25. The base portion 21 includes a member with high rigidity, and has one end portion to which the air blowing portion 24 is attached and the other end portion to which the air blowing portion 25 is attached. The base portion 21 has the one end portion and the other end portion between which the grasping portions 22 and 23 are attached.

The grasping portion 22 includes a mounting portion 31 attached to the base portion 21 and a suction portion 32 that suctions the fuel cell separator W. The mounting portion 31 supports the suction portion 32 to be movable up and down with respect to the base portion 21 under the base portion 21. The suction portion 32 includes a suction pad that can control suctioning and releasing. The suction pad has the suction force capable of grasping the fuel cell separator in a suspended state by suctioning the top surface of the fuel cell separator. For the suction pad, what is called a non-contact suction pad, which generates a negative pressure within the pad using the compressed air supplied from the compressed air supply unit to suction the fuel cell separator W using the negative pressure, is employed in this embodiment.

The grasping portion 23 is configured similarly to the grasping portion 22. The grasping portions 22 and 23 are disposed away from one another in the longitudinal direction of the fuel cell separator W so as to be able to hold the fuel cell separator W in a horizontally stable manner when the fuel cell separator W is suctioned to be lifted up. The grasping portions 22 and 23 in the first embodiment constitute a grasping portion of the fuel cell separator conveying device according to the present disclosure.

The air blowing portion 24 constitutes a pressing portion that blows air onto the protection sheet S under the fuel cell separator W through the manifold portion M of the fuel cell separator W to apply the downward force in the opposite direction of the lift-up direction of the fuel cell separator W to the protection sheet S when the moving unit moves the main body 11 in the lift-up direction of the fuel cell separator W. The air blowing portion 24 includes a mounting portion 41 attached to the one end portion of the base portion 21 and an air nozzle portion 42. The mounting portion 41 supports the air nozzle portion 42 such that the air nozzle portion 42 is positioned in the lower side, which is in the direction identical to the direction of the suction portions 32 of the grasping portions 22 and 23, with respect to the base portion 21. The air nozzle portion 42 includes a nozzle 42$a$ from which the compressed air is spouted, and a supply port and a flow passage that supply the compressed air to the nozzle 42$a$. The supply port and the flow passage are not illustrated.

The nozzle 42$a$ is disposed at the distal end of the air nozzle portion 42, and is arranged at the position facing the protection sheet S under the fuel cell separator W via the manifold portion M of the fuel cell separator W when the suction portion 32 suctions the preliminarily set position on the fuel cell separator W. Spouting the compressed air downward from the nozzle 42$a$ at such a position blows the air onto the protection sheet S under the fuel cell separator W through the manifold portion M of the fuel cell separator W to apply the downward force in the opposite direction of the lift-up direction of the fuel cell separator W to the protection sheet S, thereby ensuring biasing the protection sheet S in the direction in which the protection sheet S comes off of the fuel cell separator W.

The supply port is configured so as to supply the compressed air supplied from the compressed air supply unit via a supply pipe into the flow passage. The flow passage is formed inside the air nozzle portion 42 and is configured to supply the compressed air supplied from the supply port to the nozzle 42$a$.

The air blowing portion 25 is configured similarly to the air blowing portion 24, and is attached to the other end portion of the base portion 21 with the mounting portion 41. The air blowing portions 24 and 25 in this embodiment constitute an air blowing portion of the fuel cell separator conveying device according to the present disclosure.

The compressed air supply unit is configured of a compression machine such as a compressor that pressurizes and compresses a gas to decrease the volume to supply the compressed gas. The compressed air supply unit is electrically coupled to the control unit so as to be configured such that its operation is controlled by the control unit.

The moving unit includes a drive mechanism such as an electric motor, and is configured so as to move the base portion 21 of the main body 11 up at a predetermined ascending speed (mm/sec) and down. The moving unit is configured so as to move the main body 11 to the position where another process such as a subsequent process is performed in order that the fuel cell separator W can be conveyed after the main body 11 lifts up and takes out the fuel cell separator W from the storage container H.

The moving unit is electrically coupled to the control unit and is configured such that its operation is controlled by the control unit. The predetermined ascending speed is selected as appropriate based on data of, for example, setting specifications such as a size, a shape, and a structure of the conveying device 10 for the fuel cell separator W and the fuel cell separator W and experimental values.

The protection sheet taking-out unit is electrically coupled to the control unit and is configured such that its operation is controlled by the control unit in order to take out the protection sheet S that has come off of the fuel cell separator W from the storage container H and discard the protection sheet S. The protection sheet taking-out unit takes out the protection sheet S placed on the uppermost fuel cell separator W from the storage container H when at least one or more fuel cell separators W are housed within the storage container H.

The control unit is configured of a microcomputer including a central processing unit that executes a process with a program and a storage device that stores programs, data, and the like, and is configured so as to control operations of respective components such as the grasping portions 22 and 23, the air blowing portions 24 and 25, the compressed air supply unit, and the moving unit.

Next, a description will be given of the operation of the fuel cell separator conveying device 10 according to this embodiment with reference to the drawings.

Figure 2A:
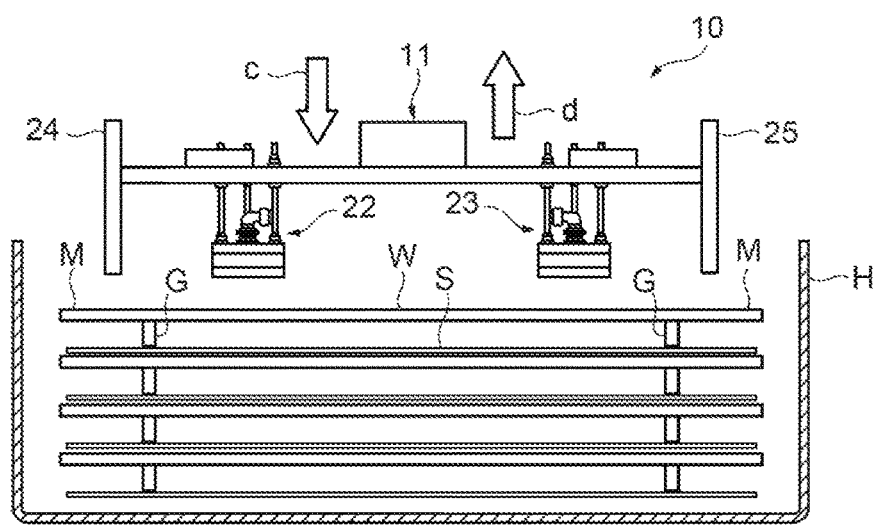
FIGS. 2A, 2B, and 2C are side views of the fuel cell separator conveying device and cross-sectional views of the storage container according to the first embodiment of the present disclosure.

First, the moving unit operates to move the main body 11 from the home position to the upper side of the fuel cell separator W stored in a state where the plurality of fuel cell separators W are stacked within the storage container H, and moves the main body 11 down in the direction indicated by the arrow c illustrated in FIG. 2A toward the fuel cell separator W stacked uppermost.

Figure 2B:
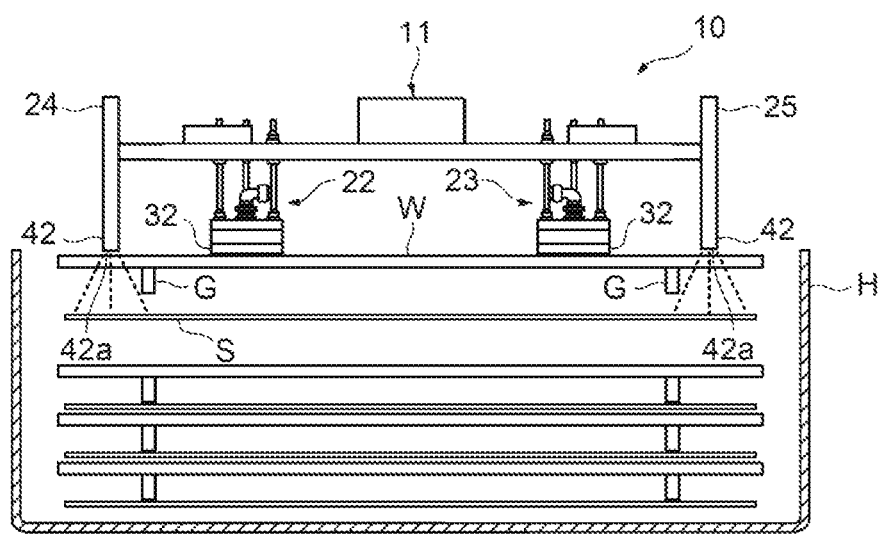

Subsequently, the grasping portions 22 and 23 of the main body 11 simultaneously operate, and, as illustrated in FIG. 2B, the respective suction portions 32 are disposed facing the top surface of the fuel cell separator W to suction the fuel cell separator W. Simultaneously with the suction or after the suction, the air blowing portions 24 and 25 operate to spout the compressed air from the nozzles 42$a$ of the respective air nozzle portions 42.

When the compressed air is spouted from the nozzles 42$a$, the air is blown toward the protection sheet S under the fuel cell separator W through the manifold portions M of the fuel cell separator W. This applies the downward force in the opposite direction of the lift-up direction of the fuel cell separator W to the protection sheet S, and thus the protection sheet S is in a state of being downwardly pressurized. The main body 11 is moved in the direction indicated by the arrow d illustrated in FIG. 2A at the predetermined ascending speed.

Figure 2C:
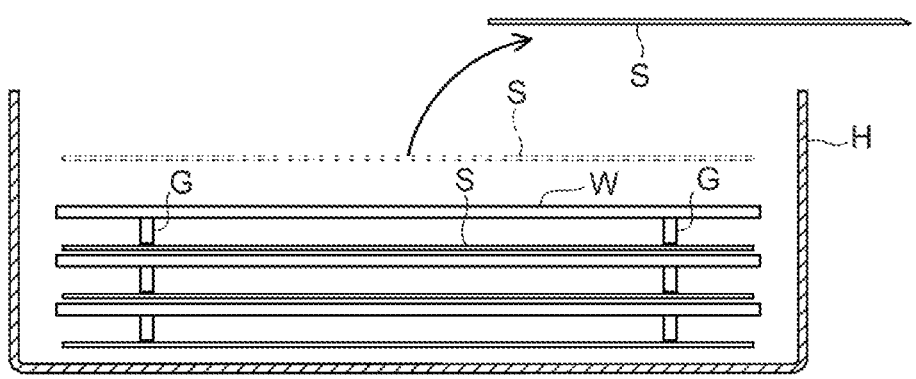

Accordingly, the fuel cell separator W is lifted upward and the protection sheet S under this fuel cell separator W comes off of the fuel cell separator W. The main body 11 returns to the home position. The moving unit conveys the fuel cell separator W in a state of being suctioned by the respective suction portions 32 to the position where another process such as the subsequent process is performed. As illustrated in FIG. 2C, the protection sheet S that has come off of the fuel cell separator W is taken out of the storage container H by the protection sheet taking-out unit and discarded.

These operations are sequentially repeated, and conveying the last fuel cell separator W in the storage container H terminates the conveyance operation of the fuel cell separators W.

Here, the relation between the ascending speed (mm/sec) of the main body 11 and the lift-up amount (cm) when the fuel cell separator W was taken out of the storage container H was examined using the fuel cell separator conveying device 10 according to this embodiment. The lift-up amount represents the amount when the protection sheet S adheres to the gasket G of the fuel cell separator W and moves with the ascending of the fuel cell separator W, that is, when the protection sheet S is lifted up together with the fuel cell separator W.

Figures 4A, 4B:
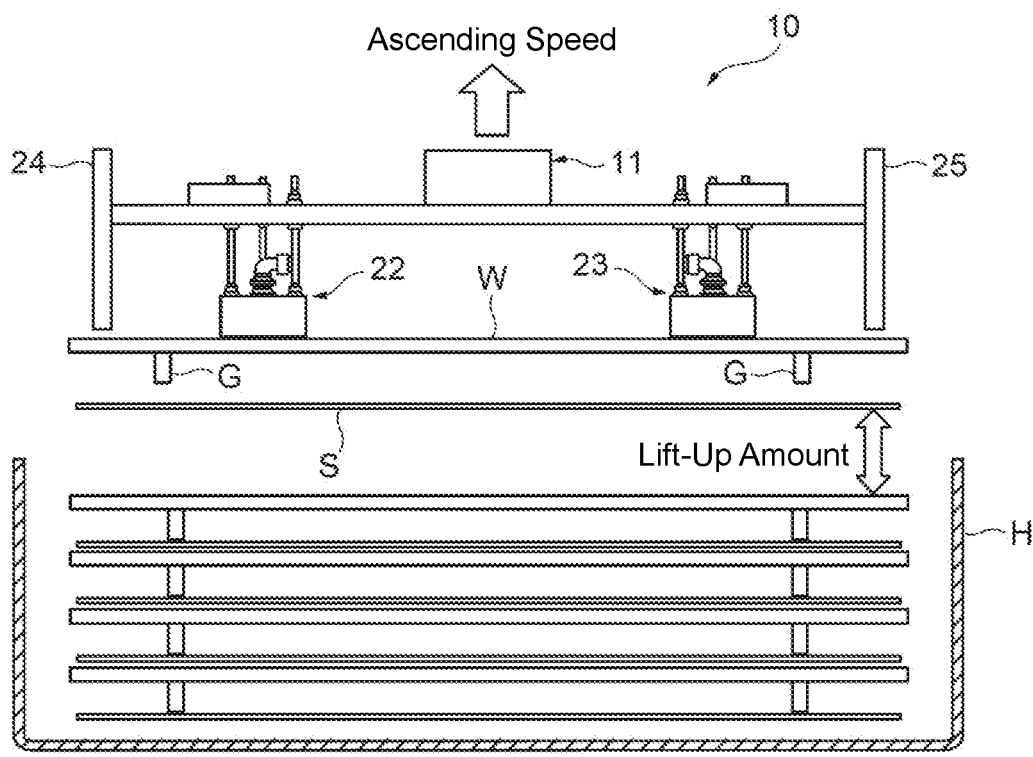
FIGS. 4A and 4B are drawings of the fuel cell separator conveying device according to the first embodiment of the present disclosure.

Specifically, the ascending speed (mm/sec) is the speed at which the main body 11 moves in the direction indicated by the arrow as illustrated in FIG. 4A. The ascending speed (mm/sec) can be set by the control unit and measured by a known speed meter. The lift-up amount (cm) is based on the position where the protection sheet S is interposed between the fuel cell separators W within the storage container H, and is represented by the distance up to where the protection sheet S comes off of the gasket G of the fuel cell separator W.

As illustrated in FIG. 4B, with the fuel cell separator conveying device 10 according to the first embodiment, when the ascending speed was 50 mm/sec, no lifting was made, and thus, the lift-up amount was 0 cm. When the ascending speed was 100 mm/sec, the lift-up amount was 1 to 5 cm, and when the ascending speed was 200 mm/sec, the lift-up amount was 3 to 10 cm.

In contrast to this, with the conventional fuel cell separator conveying device without the pressing portion such as the air blowing portions 24 and 25 that causes the protection sheet S to come off, when the ascending speed was 50 mm/sec, the lift-up amount was 3 to 8 cm, and when the ascending speed was 100 mm/sec and 200 mm/sec, the lift-up amount was 5 to 10 cm.

As a result of the examinations above, with the fuel cell separator conveying device 10 according to this embodiment, it has been confirmed that, when the ascending speed of the main body 11 was within 50 mm/sec, the protection sheet S was not lifted up, and it was possible to cause the protection sheet S to surely come off of the fuel cell separator W.

Next, a description will be briefly given of a manufacturing process for the cell for fuel cell configured by the conveying device 10 for the fuel cell separator W according to this embodiment with reference to the drawings.

As illustrated in FIG. 3, first, the gaskets G are attached to the fuel cell separator W constituting the cell for fuel cell (Step S1). Next, as illustrated in FIG. 1, the fuel cell separators W are stacked flat within the storage container H in a state where the protection sheets S are interposed, and stored within the storage container H (Step S2). The fuel cell separator W stored for the subsequent process is taken out and conveyed by the conveying mechanism of the fuel cell separator conveying device 10. The protection sheet S left within the storage container H is taken out of the storage container H by the protection sheet taking-out unit and discarded (Step S3).

The conveyed fuel cell separator W is set in a processing machine (Step S4). Next, other members that constitute the cell for fuel cell such as a sub assembly of the membrane electrode gas diffusion layer assembly other than the fuel cell separator W are set in the processing machine (Step S5). Each of the components of the cell for fuel cell set in the processing machine is heated and cooled, and pressed (Step S6). These processes manufacture the cell for fuel cell. The completed cells for the fuel cell are stacked flat without the protection sheets within another storage container (not illustrated) and stored (Step S7).

The following describes the effects of the fuel cell separator conveying device 10 according to this embodiment.

The fuel cell separator conveying device 10 according to this embodiment includes the grasping portions 22 and 23, the moving unit, and the air blowing portions 24 and 25. The grasping portions 22 and 23 grasp the fuel cell separator W by the suction force. The moving unit moves the grasping portions 22 and 23 in the lift-up direction of the fuel cell separator W. The air blowing portions 24 and 25 apply the downward force in the opposite direction of the lift-up direction of the fuel cell separator W to the protection sheet S by blowing the air onto the protection sheet S through the manifold portions M of the fuel cell separator W when the moving unit moves the grasping portions 22 and 23. This configuration applies an air pressure as the downward force in the opposite direction of the lift-up direction of the fuel cell separator W with respect to the protection sheet S under the fuel cell separator W when the fuel cell separator W is lifted up. As a result, the protection sheet S comes off of the fuel cell separator W, thereby obtaining the effect to convey the fuel cell separator W alone.

The fuel cell separator conveying device 10 according to this embodiment ensures obtaining the effect that ensures reducing the dirt adhesion on the sealing surface of the stacked fuel cell separator W using the protection sheet S and reducing the protection sheet S being left adhered when the fuel cell separator W is conveyed.

Second Embodiment

In the fuel cell separator conveying device 10 according to the first embodiment, a description has been given of a configuration in which the protection sheet S is caused to come off using the air blowing portions 24 and 25 as the pressing portion. However, in the fuel cell separator conveying device 20 according to the present disclosure, another configuration other than the air blowing portions 24 and 25 may be used as the pressing portion.

The following describes the fuel cell separator conveying device 20 according to the second embodiment in which the fuel cell separator conveying device according to the present disclosure is configured of weight pressing portions 24A and 25A instead of the air blowing portions 24 and 25 with reference to the drawings. Components similar to those of the fuel cell separator conveying device 10 according to the first embodiment are attached by reference numerals identical to the components of the fuel cell separator conveying device 10 according to the first embodiment, and its detailed description is omitted.

Figure 5:
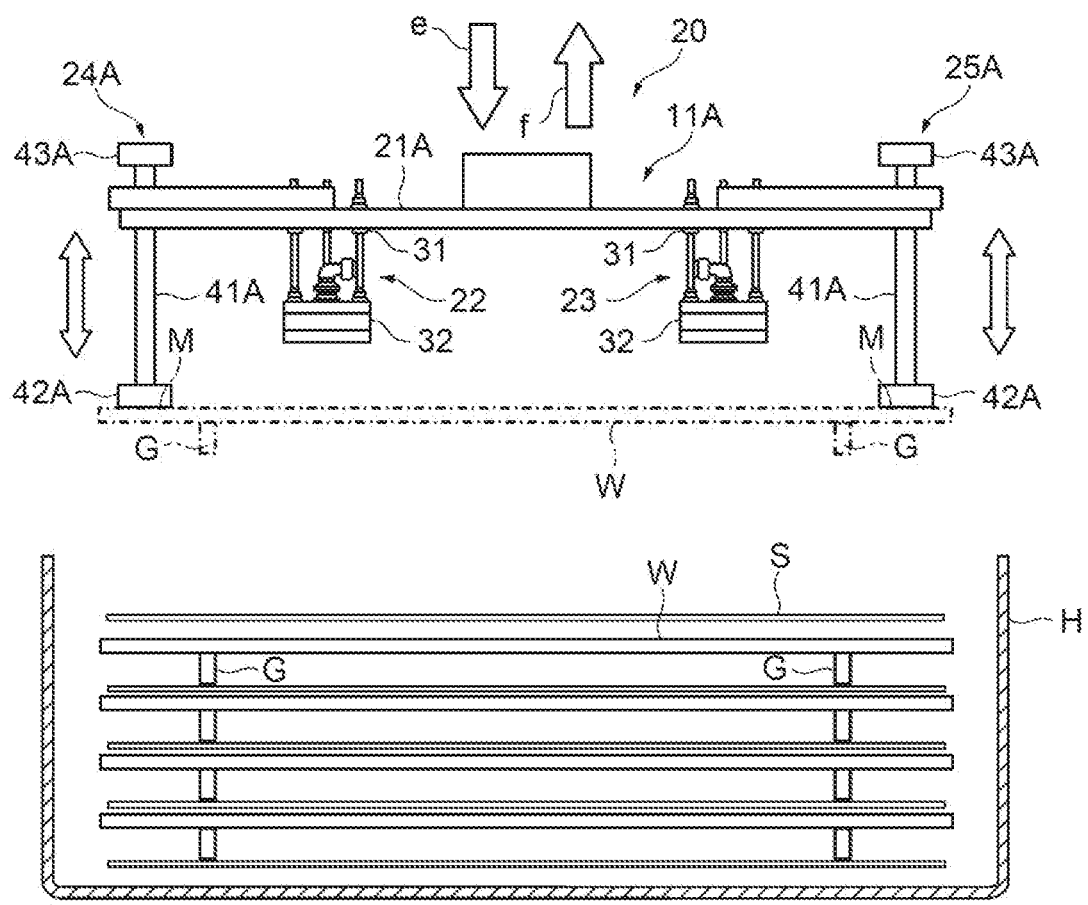
FIG. 5 includes a side view of a fuel cell separator conveying device and a cross-sectional view of a storage container according to a second embodiment of the present disclosure.

The fuel cell separator conveying device 20 is configured of a main body 11A illustrated in FIG. 5, a compressed air supply unit, a moving unit, a protection sheet taking-out unit, and a control unit, which are not illustrated. The fuel cell separator conveying device 20 has a configuration in which, the plurality of fuel cell separators W stacked inside the storage container H with the protection sheets S interposed in-between are lifted up one by one from the top while the protection sheet S is caused to come off to take the fuel cell separator W out of the storage container H and convey the fuel cell separator W similarly to the fuel cell separator conveying device 10 according to the first embodiment.

The main body 11A includes a base portion 21A, the grasping portions 22 and 23, and the weight pressing portions 24A and 25A. The base portion 21A includes a member with high rigidity, and has one end portion to which the weight pressing portion 24A is attached and the other end portion to which the weight pressing portion 25A is attached. The base portion 21A has the one end portion and the other end portion between which the grasping portions 22 and 23 are attached.

The weight pressing portion 24A is disposed at the one end portion of the base portion 21A. The weight pressing portion 24A includes a moving main body 41A that passes through the inside of the base portion 21A and freely moves up and down, a weight 42A disposed at the distal end of the moving main body 41A, and a weight 43A disposed at the end portion on the opposite side of the distal end of the moving main body 41A.

Figure 6A:
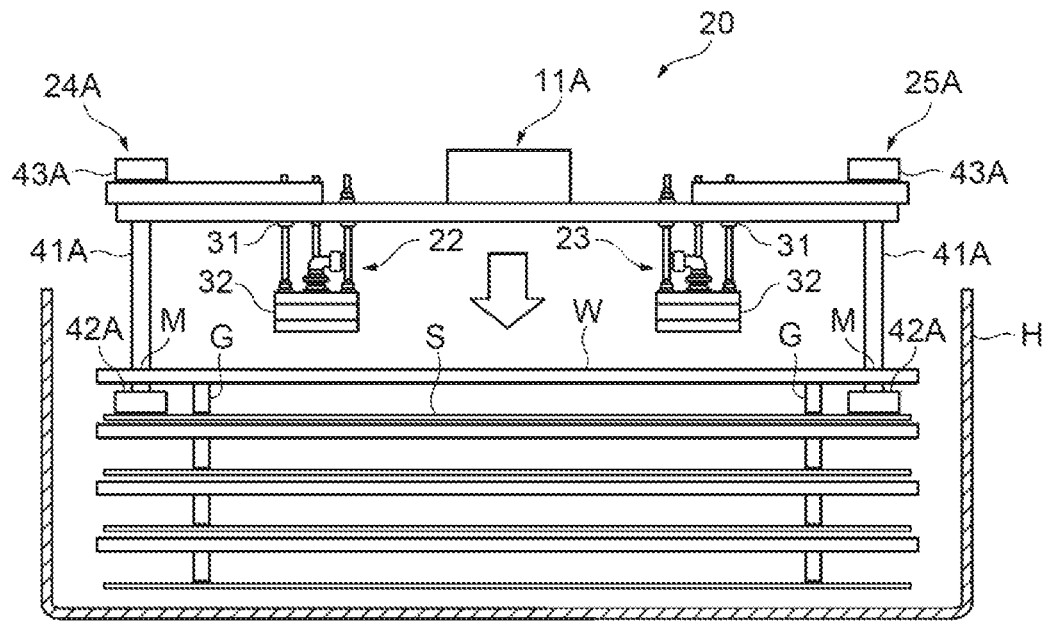
FIGS. 6A and 6B are side views of the fuel cell separator conveying device and cross-sectional views of the storage container according to the second embodiment of the present disclosure.
Figure 6B:
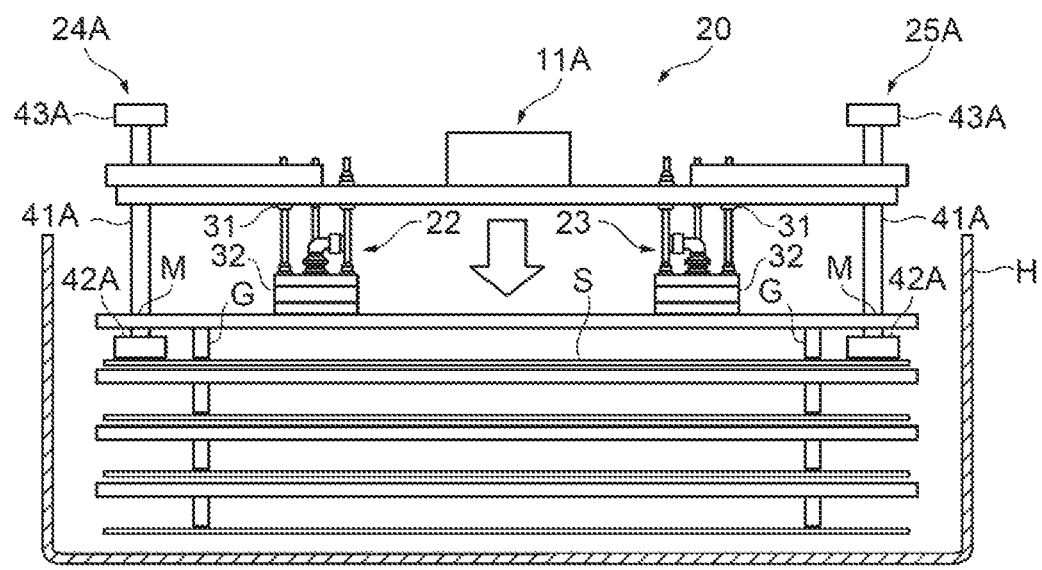

The moving main bodies 41A arrange the weights 42A at the positions where the weights 42A project down with respect to the grasping portions 22 and 23. As illustrated in FIG. 6A, the moving main bodies 41A can project downward passing through the manifold portion M of the fuel cell separator W while the grasping portions 22 and 23 are arranged apart above the fuel cell separator W, and place the weights 42A at the distal end on the protection sheet S. As illustrated in FIG. 6B, the weights 42A can be kept placed on the protection sheet S even in a state where the main body 11A is further moved down and the grasping portions 22 and 23 are suctioned on the top surface of the fuel cell separator W.

The weight 42A has a size with which the weight 42A can pass the manifold portion M of the fuel cell separator W and be directly placed on the protection sheet S laid under the fuel cell separator W. The weight 43A is to adjust the whole weight of the weight pressing portion 24A and also has a role of a stopper that regulates the downward movement limiting position of the moving main body 41A.

The weight pressing portion 24A is configured such that the self-weight of the value obtained by summing up the weights of the moving main bodies 41A and the weights 42A and 43A applies the downward force to the protection sheet S to cause the protection sheet S to act in the direction coming off of the fuel cell separator W when the weights 42A are placed on the protection sheet S through the manifold portion M of the fuel cell separator W.

The weight pressing portion 25A is configured similarly to the weight pressing portion 24A, and is disposed at the other end portion of the base portion 21A. The weight pressing portions 24A and 25A in the second embodiment constitute a weight pressing portion of the fuel cell separator conveying device according to the present disclosure.

Next, a description will be given of the operation of the fuel cell separator conveying device 20 according to the second embodiment with reference to the drawings.

First, the moving unit operates to move the main body 11A from the home position to the upper side of the fuel cell separator W stored in a state where the plurality of fuel cell separators W are stacked within the storage container H, and moves the main body 11A down in the direction indicated by the arrow illustrated in FIG. 6A toward the fuel cell separator W stacked uppermost.

As illustrated in FIG. 6B, the weights 42A of the weight pressing portions 24A and 25A pass through the manifold portions M of the fuel cell separator W and are placed on the protection sheet S under the fuel cell separator W. This applies the self-weight obtained by summing up the respective weights of the moving main bodies 41A, and the weights 42A and 43A to the protection sheet S, and thus, the protection sheet S is pressurized downward.

Then, the main body 11A further moving down causes the grasping portions 22 and 23 of the main body 11A to be close to the top surface of the fuel cell separator W. The grasping portions 22 and 23 of the main body 11A simultaneously operate to arrange the respective suction portions 32 facing the top surface of the fuel cell separator W, and the fuel cell separator W is suctioned.

Figure 7A:
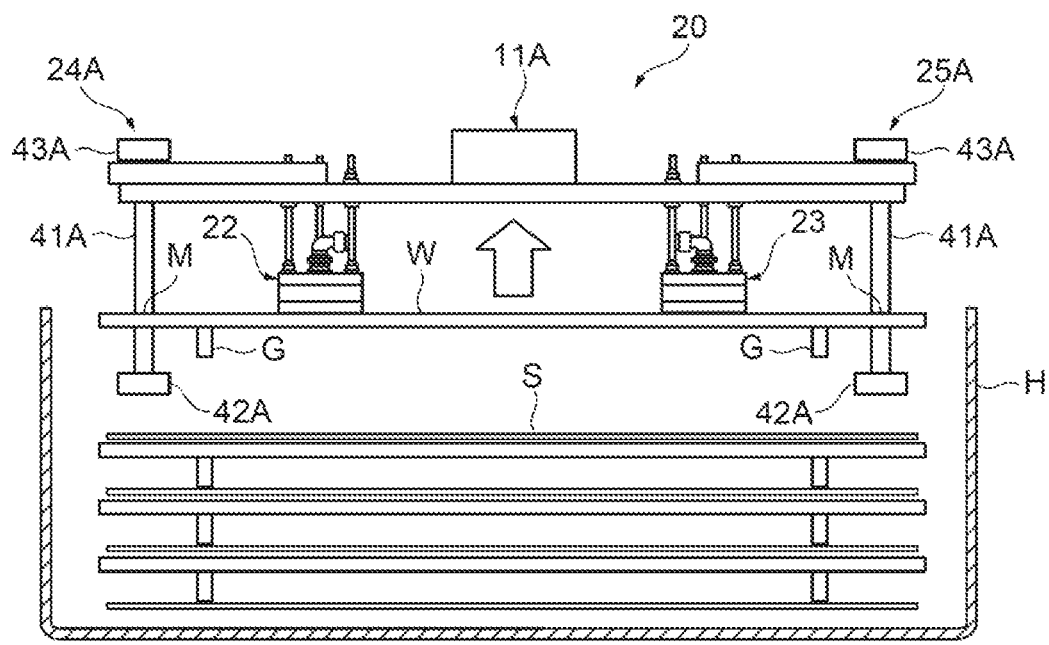
FIGS. 7A and 7B are side views of the fuel cell separator conveying device and cross-sectional views of the storage container according to the second embodiment of the present disclosure.

The main body 11 is moved in the direction indicated by the arrow illustrated in FIG. 7A at the predetermined ascending speed while the protection sheet S is pressurized downward. The self-weights of the weight pressing portions 24A and 25A apply the downward force to the protection sheet S, and thus, the protection sheet S can be caused to come off of the fuel cell separator W.

Figure 7B:
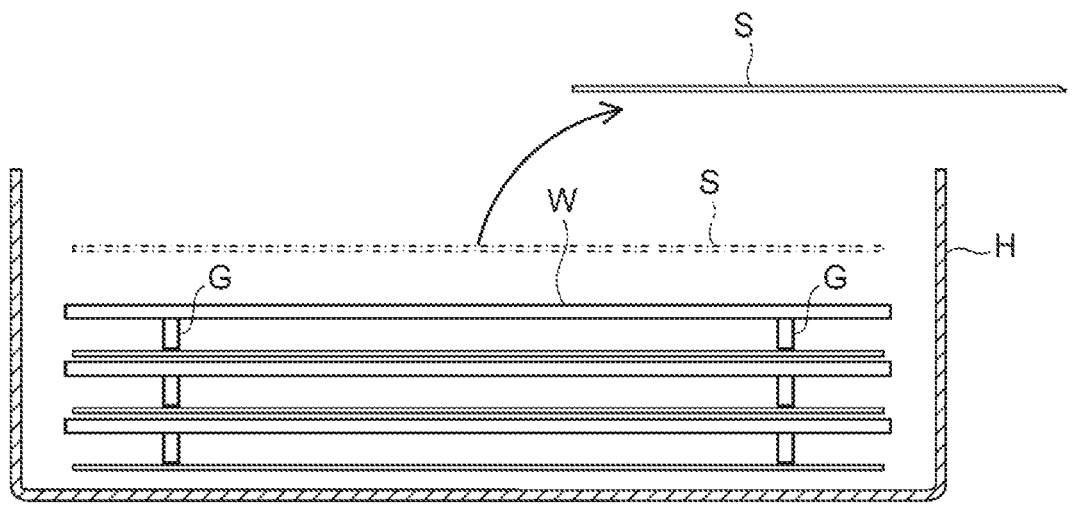
Figure 8A:
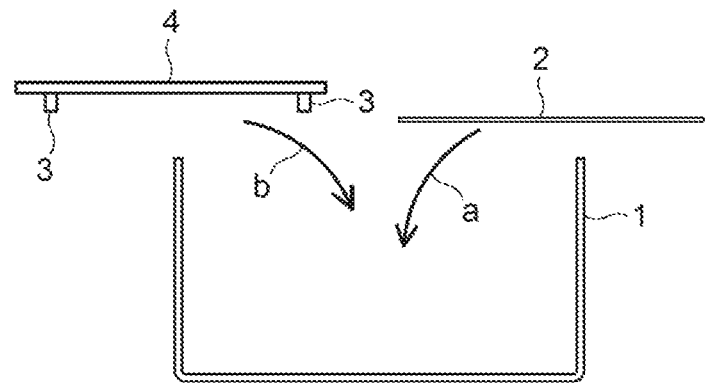
FIGS. 8A, 8B, and 8C are drawings describing a conventional fuel cell separator conveying device.
Figure 8B:
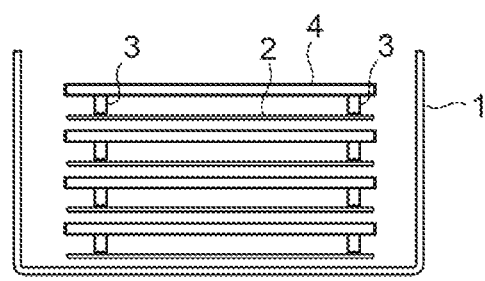
Figure 8C:
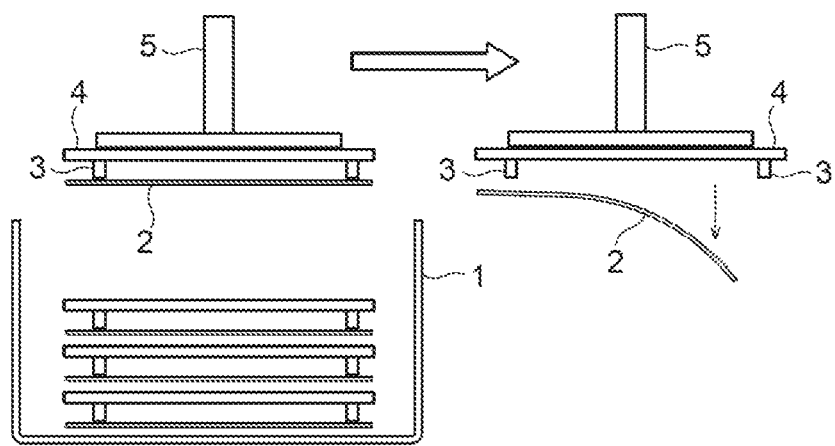

The fuel cell separator W is lifted upward, and the protection sheet S under this fuel cell separator W comes off of the fuel cell separator W. The main body 11A returns to the home position. The moving unit conveys the fuel cell separator W in a state of being suctioned by the respective suction portions 32 to the position where another process such as the subsequent process is performed. As illustrated in FIG. 7B, the protection sheet S that has come off of the fuel cell separator W is taken out of the storage container H by the protection sheet taking-out unit and discarded.

These operations are sequentially repeated, and conveying the last fuel cell separator W in the storage container H terminates the conveyance operation of the fuel cell separators W.

Here, the relation between the ascending speed (mm/sec) of the main body 11A and the lift-up amount (cm) when the fuel cell separator W was taken out of the storage container H was examined using the fuel cell separator conveying device 20 according to this embodiment similarly to the fuel cell separator conveying device 10 according to the first embodiment.

In the fuel cell separator conveying device 20 according to this embodiment, as illustrated in FIG. 4B, when the ascending speed was 50 mm/sec, 100 mm/sec, and 200 mm/sec, no lifting was made, and thus, the lift-up amount was 0 cm.

In contrast to this, with the conventional fuel cell separator conveying device without the pressing portion such as the weight pressing portions 24A and 25A that causes the protection sheet S to come off, when the ascending speed was 50 mm/sec, the lift-up amount was 3 to 8 cm, and when the ascending speed was 100 mm/sec and 200 mm/sec, the lift-up amount was 5 to 10 cm.

As a result of the examinations above, with the fuel cell separator conveying device 20 according to this embodiment, it has been confirmed that, when the ascending speed of the main body 11A was within 200 mm/sec, the protection sheet S was not lifted up, and it was possible to cause the protection sheet S to surely come off of the fuel cell separator W.

The following describes the effects of the fuel cell separator conveying device 20 according to this embodiment.

The fuel cell separator conveying device 20 according to this embodiment includes the grasping portions 22 and 23, the moving unit, and the weight pressing portions 24A and 25A. The grasping portions 22 and 23 grasp the fuel cell separator W by the suction force. The moving unit moves the grasping portions 22 and 23 in the lift-up direction of the fuel cell separator W. The weight pressing portions 24A and 25A apply the downward force in the opposite direction of the lift-up direction of the fuel cell separator W to the protection sheet S by the self-weights through the manifold portions M of the fuel cell separator W when the moving unit moves the grasping portions 22 and 23. This configuration causes the pressure by the self-weights of the weight pressing portions 24A and 25A as the downward force in the opposite direction of the lift-up direction of the fuel cell separator W to act on the protection sheet S under the fuel cell separator W when the fuel cell separator W is lifted up. As a result, the protection sheet S comes off of the fuel cell separator W, thereby obtaining the effect to convey the fuel cell separator W alone.

The fuel cell separator conveying device 20 according to this embodiment ensures obtaining the effect that ensures reducing the dirt adhesion on the sealing surface of the stacked fuel cell separator W using the protection sheet S and reducing the protection sheet S being left adhered when the fuel cell separator W is conveyed.

While the first embodiment and the second embodiment of the present disclosure have been described in detail above, the present disclosure is not limited thereto, and can be subjected to various kinds of changes in design without departing from the spirit and scope of the present disclosure described in the claims.

DESCRIPTION OF SYMBOLS 10, 20 Fuel cell separator conveying device
11, 11A Main body
21, 21A Base portion
22, 23 Grasping portion
24, 25 Air blowing portion
24A, 25A Weight pressing portion
31, 41 Mounting portion
32 Suction portion
41A Moving main body
42 Air nozzle portion
42A, 43A Weight
42a Nozzle
G Gasket
H Storage container
M Manifold portion
S Protection sheet
W Fuel cell separator

What is claimed is:

1. A fuel cell separator conveying device that lifts up and conveys a fuel cell separator placed on a protection sheet, the fuel cell separator conveying device comprising:
   a grasping portion configured to grasp the fuel cell separator by suction force;
   a moving unit that configured to move the grasping portion in a lift-up direction of the fuel cell separator; and
   a pressing portion configured to apply a downward force in an opposite direction of the lift-up direction of the fuel cell separator to the protection sheet through an opening of the fuel cell separator at the time the moving unit moves the grasping portion in the lift-up direction of the fuel cell separator and begins to lift up the fuel cell separator.

2. The fuel cell separator conveying device according to claim 1,
   wherein the pressing portion includes an air blowing portion that applies the downward force to the protection sheet by blowing air onto the protection sheet through the opening of the fuel cell separator.

3. The fuel cell separator conveying device according to claim 1,
   wherein the pressing portion includes a weight pressing portion that applies the downward force to the protection sheet by a self-weight by being placed on the protection sheet through the opening of the fuel cell separator.

* * * * *